US007015464B2

(12) United States Patent
Nagano et al.

(10) Patent No.: US 7,015,464 B2
(45) Date of Patent: Mar. 21, 2006

(54) APPARATUS FOR DETECTING CHEMICAL SUBSTANCES AND METHOD THEREFOR

(75) Inventors: Hisashi Nagano, Hino (JP); Izumi Waki, Tokyo (JP); Yasuaki Takada, Kiyose (JP)

(73) Assignee: Hitachi, Ltd., Tokyo (JP)

( * ) Notice: Subject to any disclaimer, the term of this patent is extended or adjusted under 35 U.S.C. 154(b) by 98 days.

(21) Appl. No.: 10/780,880

(22) Filed: Feb. 19, 2004

(65) Prior Publication Data

US 2005/0061964 A1 Mar. 24, 2005

(30) Foreign Application Priority Data

Sep. 22, 2003 (JP) ............................ 2003-329294

(51) Int. Cl.
*H01J 44/04* (2006.01)
*G01N 24/00* (2006.01)

(52) U.S. Cl. ....................... 250/288; 250/282; 250/284

(58) Field of Classification Search ................ 250/287, 250/284; 73/866

See application file for complete search history.

(56) References Cited

U.S. PATENT DOCUMENTS 5,092,155 A 3/1992 Rounbehler et al.
5,741,984 A * 4/1998 Danylewych-May et al. ............... 73/864.71
5,859,362 A * 1/1999 Neudorfl et al. ............. 73/23.2
6,111,250 A * 8/2000 Thomson et al. ........... 250/282

FOREIGN PATENT DOCUMENTS

| | | |
|---|---|---|
| JP | 4-194743 | 11/1990 |
| JP | 7-6729 | 3/1991 |
| JP | 5-264505 | 1/1993 |
| JP | 2000-28579 | 7/1998 |
| JP | 2000-162189 | 11/1998 |

* cited by examiner

*Primary Examiner*—Nikita Wells
*Assistant Examiner*—David A. Vanore
(74) *Attorney, Agent, or Firm*—Reed Smith LLP; Stanley P. Fisher, Esq.; Juan Carlos A. Marquez, Esq.

(57) ABSTRACT

An apparatus for detecting chemical substances which is high in sensitivity and selectivity is provided. An organic acid or an organic acid salt is used to generate an organic acid gas from an organic acid gas generator to be mixed with a sample gas for introduction into an ion source for ionization, thereby obtaining a mass spectrum by a mass analysis region. A data processor determines the detection or non-detection of a specific m/z of an organic acid adduct ion obtained by adding a molecule generated from the organic acid to a molecule with specific m/z generated from a target chemical substance to be detected based on the obtained mass spectrum. When there is an ion peak with the m/z of the organic acid adduct ion, the presence of the target chemical substance to be detected is determined, and an alarm is sounded. False detection can be prevented.

19 Claims, 12 Drawing Sheets

APPARATUS FOR DETECTING CHEMICAL SUBSTANCES AND METHOD THEREFOR

FIELD OF THE INVENTION

The present invention relates to a technique for detecting chemical substances such as environmental chemical substances, harmful chemical substances, narcotics or explosives. More specifically, the present invention relates to an apparatus for detecting chemical substances using a mass spectrometer.

DESCRIPTION OF THE RELATED ART

Detection techniques for detecting narcotics or explosives are broadly divided into the so-called bulk detection identification of an object based on its shape or density such as used in X-ray inspection equipment, and the so-called trace detection of very small amounts of chemical substances adhering to an object. In trace detection, techniques for detecting explosives include a chemiluminescence method, an ion mobility method and a mass analysis method.

In the chemiluminescence method, an extracted sample is separated by gas chromatography to be reacted with a luminescent reagent for detecting luminescence, thereby performing chemical substance identification for explosive detection (Prior Art 1: U.S. Pat. No. 5,092,155). The extracted substance is separated by a gas chromatograph so that the sensitivity to a specific detection target is very high and the ability to identify the substance (hereinafter, selectivity) is high.

In the ion mobility method, the extracted sample is heated and vaporized to ionize the gaseous sample by an ion source using a radioactive ray. The ions drift in an atmosphere in an electric field to measure mobility, thereby performing chemical substance identification for explosive detection (Prior Art 2: Japanese Patent Application Laid-Open No. 5-264505).

In addition, in the ion mobility method, chlorine or a chlorinated compound (hereinafter, chlorine dopant) is introduced at ionization so that an explosive molecule reacts with chlorine ion to generate an adduct ion obtained by adding the chlorine ion to the explosive molecule. The adduct ion is detected to perform explosive detection (Prior Art 3: Japanese Patent application Laid-Open No. 7-006729). In the method for detecting the adduct ion, the generation efficiency of the adduct ion is high so that the signal intensity observed is increased and the detection sensitivity becomes high. An ion obtained by ionizing the detection target through the original ionization process is observed together with the chlorine adduct ion. The number of-signals is increased to enhance the selectivity.

As an example of a detection system using the mass analysis method, a method using an atmospheric pressure chemical ionization method is known (Prior Art 4: Japanese Patent Application Laid-Open No. 2000-28579). In this method, an explosive molecule is ionized by chemical reaction under atmospheric pressure to perform mass analysis of the generated ion for substance identification and explosive detection. Since the extracted substance is directly introduced into the ion source under atmospheric pressure for performing mass analysis, no pretreatment such as concentration and separation is necessary and continuous and speedy detection can be made. A negative atmospheric pressure chemical ionization method has the characteristic of selectively ionizing nitro compounds having high electron affinity. As this method is not easily affected by impurities, the-signal intensity is high so that the sensitivity is high. In the detection region, a mass spectrometer used for precision chemical analysis such as a quadrupole mass spectrometer or an ion trap mass spectrometer is employed. Since a difference of a molecular weight of 1 amu can be identified, the selectivity is high. In actual operation, an impurity can be identified from a detection target.

In the mass analysis method, a method has also been proposed for detecting an adduct ion obtained by adding a chlorine ion to an explosive molecule using a chlorine dopant (Prior Art 5: 7th International Symposium on Analysis and Detection of Explosives, 2001, Samantha L. Richards et al, The Detection of Explosive Residues from Boarding Passes, PP.60).

In the mass analysis of an organic polar compound, an organic polar compound containing a hydroxyl group or a carboxyl group is mixed with a halogenated compound for ionizing the halogenated compound (Prior Art 6: Japanese Patent No. 2667576).

For monitoring a chemical substance using the mass analysis method, a method for performing tandem mass analysis of a plurality of molecular species to be measured simultaneously, has been disclosed (Prior Art 7: Japanese Patent Application Laid-Open No. 2000-162189).

SUMMARY OF THE INVENTION

In the method of Prior Art 1, pretreatment for concentrating the extracted substance and for separating it by gas chromatography is necessary. It takes a long time for detection. It is unsuitable for examining a large number of pieces of baggage such as baggage examination at an airport.

In the method of Prior Art 2, the detection can be made in a short time, but a sufficient signal intensity for a detection target is hard to obtain and the sensitivity is low. Due to drift under atmospheric pressure conditions with numerous collisions, the separation is poor and the selectivity is low. The low selectivity essentially provides much false information.

In Prior Art 3, to solve the problems of the sensitivity and selectivity of Prior Art 2, a chlorine dopant having a low density is introduced. In detection in a clean environment, the sensitivity can be high. In actual operation, a large number of interfering substances other than the detection target exist. During operation in such an interference substance environment, sufficient sensitivity and selectivity cannot be obtained. The interfering substance will hereinafter be referred to as an impurity. In a baggage wipe examination, this corresponds to a constituent originating from baggage (such as the smell of the material of the baggage itself) or to dirt, oil and cosmetics adhering to the surface of the baggage. There is much false detection such as false detection of impurities other than the detection target or false detection of a plurality of similar detection targets. A chlorinated compound is used as the dopant, which can affect the human body and the environment. As a radioactive isotope is used as the ion source, its use and storage must be permitted, which limits the operation.

In Prior Art 4, the extracted substance is directly introduced into an ion source under atmospheric pressure for performing mass analysis. It is desirable to improve the sensitivity and selectivity.

In Prior Art 5, to obtain improved sensitivity and selectivity in the mass analysis method, as in Prior Art 3, a method is performed for detecting a chlorine adduct ion obtained by adding a chlorinated ion to a detection target by introduction of a chlorine dopant. The use of the chlorine compound can affect the human body and the environment.

Prior Art 6 is an effective method for detection of a halogenated compound, but it has a low effect for a nitro compound including most explosives.

In Prior Art 7, tandem mass analysis is effectively used for excluding impurities. It must be further developed for detection of very small amounts of constituents such as explosive detection.

An object of the present invention is to provide a dangerous substance detection system excellent in speed, sensitivity and selectivity. Another object of the present invention is to provide a high performance detection system using no substances which can affect the human body and the environment, such as radioactive isotopes and halogenated compounds.

The present invention has been conceived based on new findings that in a negative atmospheric pressure chemical ionization method, an ion obtained by adding a substance having a relatively large molecular weight such as an organic acid to an explosive molecule, typically a nitro compound, is generated.

In an apparatus for detecting chemical substances according to the present invention, a gas of an organic acid or an organic acid salt (hereinafter, all of these will be referred to as organic acids and the organic acid gas will be referred to as an organic acid dopant) is generated from a generator generating an organic acid gas, which is mixed with a sample gas to be introduced into an ion source for performing ionization. The ions are analyzed by mass analysis region to obtain a mass spectrum. A data processor compares the mass spectrum with a detection database. The data processor determines the detection or non-detection of an adduct ion (hereinafter, organic acid adduct ion) obtained by adding a molecule generated from an organic acid (which is the generic name for an organic acid, a molecule generated by decomposition of an organic acid, and a molecule generated by reaction of an organic acid with another molecule, which will hereinafter be referred to as an organic acid molecule) to a molecule generated from a target chemical substance to be detected. When the organic acid adduct ion with specific m/z is detected, the presence of the target chemical substance to be detected is determined and an alarm is sounded.

The apparatus for detecting chemical substances according to the present invention will be described below in greater detail.

The apparatus for detecting chemical substances according to the present invention comprises an ion source, an analysis region, and a data processor. A sample is ionized by the ion source. The analysis region measures an ion species of the sample. The data processor determines the presence or absence of a target chemical substance to be detected in the sample. The data processor determines the detection or non-detection of an ion generated by reaction of a molecule of the target chemical substance with a molecule of an organic acid or an organic acid salt having a mass number of 40 to 400. After the determination, when the presence thereof is determination, an alarm is sounded.

The analysis region analyzes the ion species. It is selected from regions analyzed by a quadrupole mass spectrometer, an ion trap mass spectrometer and an ion mobility analyzer. As the analysis region, for example, a mass analysis region for obtaining a mass spectrum of ions of the sample is used.

The organic acid or the organic acid salt is an organic acid or an organic acid salt having a hydroxyl group or a carboxyl group. Typically, a lactic acid or a lactate is used.

The data processor (1) determines the detection or non-detection of the generated ion, or the detection or non-detection of an ion generated by reaction of a molecule generated from the organic acid or the organic acid salt with a molecule of the target chemical substance, and (2) determines one or more of the detection or non-detection of an ion generated from the target chemical substance, the detection or non-detection of the generated ion, and the detection or non-detection of an ion generated by reaction of a molecule generated from the organic acid or the organic acid salt with a molecule of the target chemical substance to determine the presence or absence of the target chemical substance.

The apparatus for detecting chemical substances according to the present invention performs tandem mass analysis.

(1) Tandem mass analysis is performed on the generated ion. The data processor determines the detection or non-detection of a fragment ion of the generated ion to determine the presence or absence of the target chemical substance.

(2) Tandem mass analysis is performed on an ion generated by reaction of a molecule generated from the organic acid or the organic acid salt with a molecule of the target chemical substance. The data processor determines the detection or non-detection of a fragment ion of the generated ion to determine the presence or absence of the target chemical substance.

(3) Tandem mass analysis is performed simultaneously on one or more of an ion generated from the target chemical substance, the generated ion, and an ion generated by reaction of a molecule generated from the organic acid or the organic acid salt with a molecule of the target chemical substance. The data processor determines the detection or non-detection of a fragment ion of an ion generated from the target chemical substance and the detection or non-detection of a fragment ion of the generated ion to determine the presence or absence of the target chemical substance.

An example of an apparatus for detecting chemical substances according to the present invention comprises a heating unit for generating a sample gas, a gas generator generating a gas of an organic acid or an organic acid salt having a mass number of 40 to 400, a gas mixer for mixing the gas of the organic acid or the organic acid salt with the sample gas generated by the heating unit to generate a mixed gas, a mass analysis region for obtaining a mass spectrum of ions of the mixed gas, and a data processor for determining the presence or absence of a target chemical substance to be detected in the sample based on the mass spectrum.

Another example of an apparatus for detecting chemical substances according to the present invention comprises an introduction region for introducing a sample gas, a gas generator for generating a gas of an organic acid or an organic acid salt having a mass number of 40 to 400, a gas mixer for mixing the gas of the organic acid or the organic acid salt with the sample gas introduced by the introduction region to generate a mixed gas, a mass-analysis region for obtaining a mass spectrum of ions of the mixed gas, and a data processor for determining the presence or absence of a target chemical substance to be detected in the sample gas based on the mass spectrum.

A further example of an apparatus for detecting chemical substances according to the present invention comprises wipe materials dipped with an organic acid or an organic acid salt having a mass number of 40 to 400 to extract a sample from a detection target, a heating unit for heating the wipe materials to generate a mixed gas obtained by mixing a gas of the organic acid or the organic acid salt with a gas of the sample, a mass analysis region for obtaining a mass spectrum of ions of the mixed gas, and a data processor for determining the presence or absence of a target chemical substance to be detected in the sample based on the mass spectrum.

In the above construction, the data processor determines the detection or non-detection of an ion generated by reaction of a molecule of the target chemical substance with a molecule of the organic acid or the organic acid salt to determine the presence or absence of the target chemical substance.

A method for detecting chemical substances according to the present invention comprises the steps of: ionizing a sample, analyzing an ion species of the sample, and determining the detection or non-detection of an ion generated by reaction of a molecule of the target chemical substance with a molecule of an organic acid or an organic acid salt having a mass number of 40 to 400 based on the analysis result of the ion species to determine the presence or absence of the target chemical substance.

Another method for detecting chemical substances according to the present invention comprises the steps of: generating a sample gas, mixing a gas of an organic acid or an organic acid salt having a mass number of 40 to 400 with the sample gas to generate a mixed gas, ionizing the mixed gas, obtaining a mass spectrum of ions of the mixed gas, and determining the detection or non-detection of an ion generated by reaction of a molecule of the target chemical substance with a molecule of the organic acid or the organic acid-salt to determine the presence or absence of the target chemical substance.

According to the present invention, an organic acid is added to enhance the detection sensitivity with a consumption lower than that of a prior art chlorine dopant. An organic acid tends to be a negative ion and easily generates an adduct ion with an explosive molecule, which is suitable for an explosive detection system. An organic acid adduction is detected to be at a position of a mass number higher than that of a chlorine adduct ion. It is easily identified from a molecular ion generated from a detection target to enhance the selectivity. It is thus possible to prevent false detection.

DETAILED DESCRIPTION OF THE PREFERRED EMBODIMENTS

Figure 1:
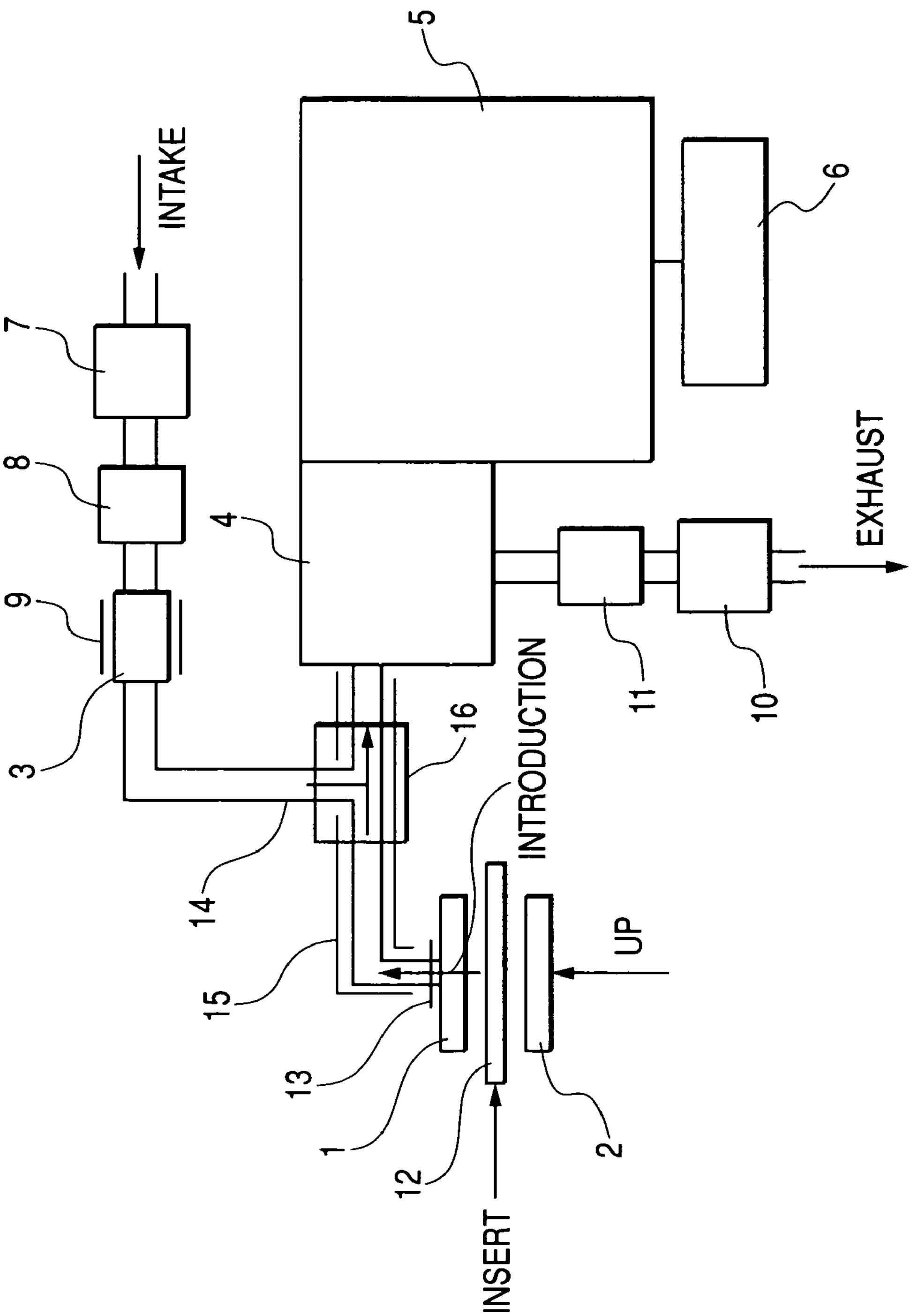
FIG. 1 is a diagram showing an example of an explosive detection system according to a first embodiment of the present invention.

Some embodiments of the present invention will be described below in detail referring to the drawings.

In FIGS. 3, 4, 5, 6, 10, 13, 14 and 15 described below, the horizontal axis indicates m/z and the vertical axis indicates signal intensity.

An apparatus for detecting chemical substances according to the present invention detects an ion generated by reaction with a molecule generated from an organic acid or an organic acid salt to detect environmental chemical substances, harmful chemical substances, narcotics and explosives.

An explosive detection system will be described below as an example of the apparatus for detecting chemical substances. RDX is used as an example of explosives. The present invention is not limited thereto.

For comparison with the present invention, a mass spectrum obtained by a prior art method using a chlorine dopant will be described for reference.

Figure 3:
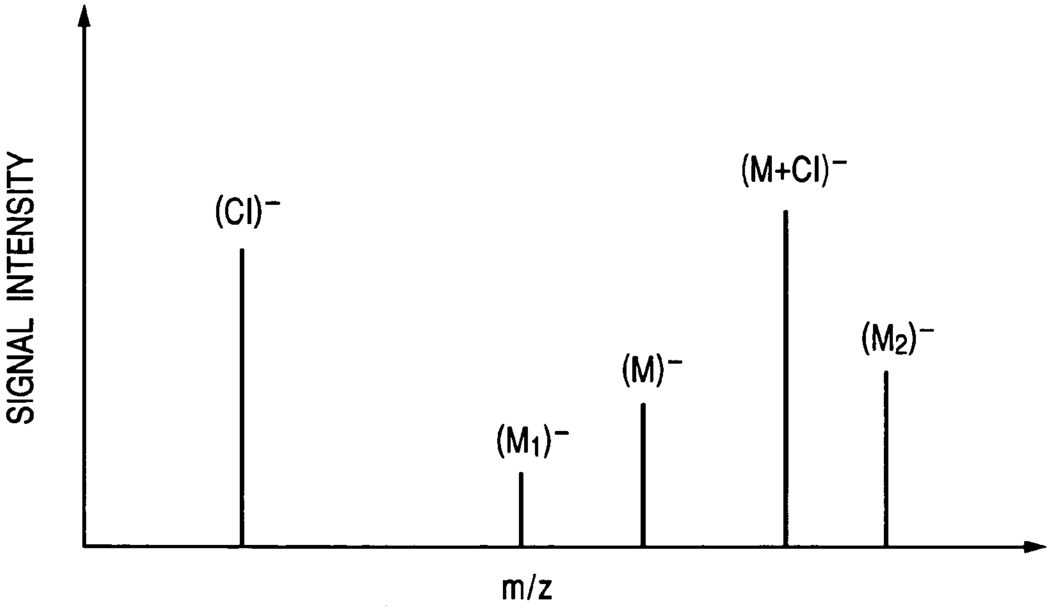
FIG. 3 is a diagram showing an example of a mass spectrum of a chlorine adduct ion obtained by a prior art explosive detection system.

A mass spectrum when introducing a chlorine dopant will be described using FIG. 3. Typically, without introducing a chlorine dopant, an ion peak of a molecular ion ($(M)^-$) of a detection target, a specific molecule desorbed ion ($(M_1)^-$) and a specific molecule adduct ion ($(M_2)^-$) generated from the detection target are detected. Introduction of the chlorine dopant gives an ion peak of a chlorine ion ($(Cl)^-$). A chlorine adduct ion ($(M+Cl)^-$) obtained by adding a chlorine ion to the detection target is also detected. When a chlorine dopant is introduced in a suitable amount, the chlorine adduct ion is efficiently generated. The signal intensity of the chlorine adduct ion is higher than that of the specific ion peaks generated from the detection target when introducing no chlorine, that is, $(M)^-$, $(M_1)^-$ and $(M_2)^-$. Even when the amount of the detection target is small, the signal of the ion peak of the chlorine adduct ion is observed to be strong. The sensitivity is increased to detect very small amounts of samples. With the ion peaks of the detection target, the ion peak of the chlorine adduct ion is detected to be at a position of a high mass number due to chlorine (mass numbers of 35 and 37). Detection and determination of a plurality of ion peaks can be performed to enhance the selectivity.

Figure 4:
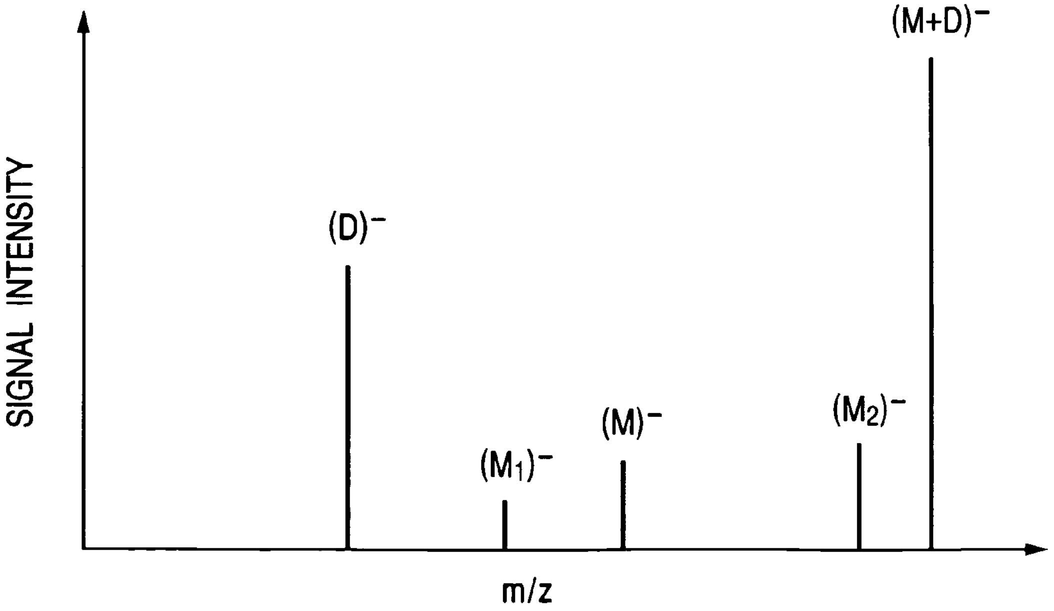
FIG. 4 is a diagram showing an example of a mass spectrum of an organic acid adduct ion obtained by an explosive detection system according to an embodiment of the present invention.

FIG. 4 is a diagram showing an example of a mass spectrum of an organic acid adduct ion obtained by the explosive detection system according to an embodiment of the present invention.

Using FIG. 4, a mass spectrum obtained when using an organic acid dopant of the present invention will be described. Typically, when introducing no organic acid dopant, an ion peak of a molecular ion $((M)^-)$ generated from a detection target, a specific molecule desorbed ion $((M_1)^-)$ obtained by desorbing a specific molecule from the detection target and a specific molecule adduct ion $((M_2)^-)$ are detected. Introduction of the organic acid dopant gives an ion $((D)^-)$ generated from the organic acid molecule. An organic acid adduct ion $((M+D)^-)$ obtained by adding the organic acid molecular ion is also detected. Depending on the kind of organic acid and an explosive to be detected, hydrogen desorbed $(M+D-H)^-$ and hydrogen added $(M+D+H)^-$ may be detected. A plurality of kinds of ions generated from an organic acid may be obtained. A plurality of kinds of organic acid adduct ions may be also obtained. There are various kinds of explosives which may be detected. The addition reaction of an explosive with an ion generated from an organic acid is complex. It is difficult to predict what adduct ion is obtained. It is important to obtain a detection database based on an experiment. The presence of absence of a detection target is determined based on the detection database stored in the data processor.

[Embodiment 1]

FIG. 1 is a diagram showing an example of an explosive detection system according to Embodiment 1 of the present invention. An apparatus for detecting chemical substances according to Embodiment 1 employs a wipe method using an organic acid gas generator.

As shown in FIG. 1, the apparatus has a heating unit 2 having an absorption region 1 (upper heater) and a lower heater, an organic acid gas generator 3, an ion source 4, a mass analysis region 5, and a data processor 6. Lactic acid of about 400 μL (microliter) as an example of an organic acid is put into the organic acid gas generator 3 and is heated to about 40° C. by a generator heater 9 for generating lactic acid vapor. It is introduced into the ion source 4 at a flow rate of about 0.1 L (liter)/min by a pushing pump 7 and a pushing flow controller 8. The pushing flow rate may be a flow rate not reversely flowing to the introduction region 1 side.

To introduce the vapor or fine particles from the introduction region 1, the gas is introduced into the ion source 4 at a flow rate of about 0.5 L/min by an intake pump 10 and an intake flow controller 11. The ion source 4 ionizes the sample. An ion generated by the ion source 4 is introduced through an aperture having an inner diameter of about 0.2 mm in the vacuum-exhausted mass analysis region 5. The gas is introduced from the aperture to the mass analysis region 5 side at about 0.5 L/min. The flow rate of the sample gas introduced from the introduction region 1 is about 0.9 L/min.

In an examination, baggage is wiped by wipe materials 12 to extract small amounts of explosive constituents. The wipe materials 12 are inserted into the heating unit 2 having the introduction region 1 (upper heater) and the lower heater. The introduction region 1 (upper heater) and the heating unit 2 may be maintained at a temperature at which the extracted sample is vaporized. On this occasion, they are both heated to 210° C.

When the wipe materials 12 are inserted, the heating unit 2 is raised to interpose the wipe materials 12 for heating to vaporize the explosive sample. The vaporized sample passes through a heated filter 13 (for example, heated to 210° C.) and a pipe 14 (for example, heated to 180° C.) heated by a pipe heater 15 to be mixed with the lactic acid vapor generated in the organic acid gas generator 3 in a mixer 16 for introduction into the ion source 4. The filter 13 is provided for preventing dust from being absorbed. The ion source 4 ionizes the mixed gas and the mass analysis region 5 performs mass analysis thereof.

The details of the ion source and the mass analysis will be described.

Figure 2:
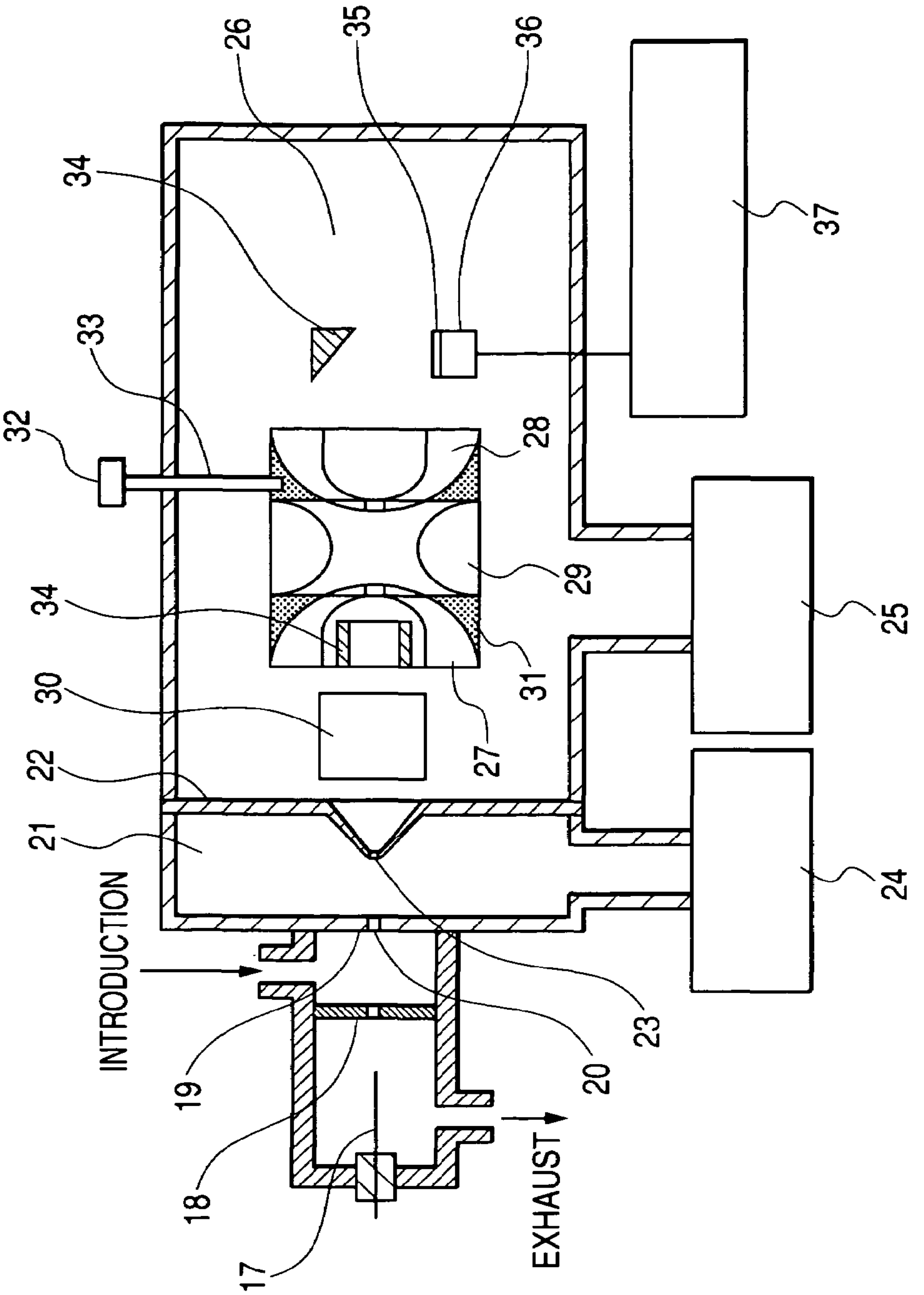
FIG. 2 is a diagram showing an example of an ion source and an analysis region according to the first embodiment of the present invention.

FIG. 2 is a diagram showing an example of the ion source and the analysis region in the apparatus for detecting chemical substances according to Embodiment 1 of the present invention.

Any ion source which can generate an ion species of a sample may be used. For example, a radioactive ray source, an electron beam, a light, a laser and corona discharge can be used. An analysis region capable of analyzing the ion species may be used. The mass analysis is not necessarily used. The ion mobility method may be also used.

FIG. 2 shows a construction in which the atmospheric pressure ionization method is used for the ion source and an ion trap mass spectrometer is used for analyzing the ion species. In the ion source, corona discharge in the atmosphere is used to generate a primary ion and chemical reaction of the primary ion with a sample molecule is used to ionize the sample molecule. A needle electrode 17 is arranged in the ion source. A high voltage is applied between it and a counter electrode 18 to generate a corona discharge near the edge of the needle electrode. Nitrogen, oxygen and steam in the air are ionized by the corona discharge to generate a primary ion.

The generated primary ion moves to-an apertured electrode (first aperture) 19 side due to an electric field. The vapor or fine particles of the sample including a detection target introduced through the pipe passes through the opening of the counter electrode 18 to flow into the needle electrode 17 side. The vapor or fine particles reacted with the primary ion are ionized. In a negative ionization mode for generating a negative ion by applying a negative high voltage to the needle electrode 17, the primary ion is often an oxygen molecular ion. A representative negative ionization reaction in a sample molecule (M) is shown below.

$$M+(O2)-\rightarrow M-+O2$$

The generated sample molecular ion has a potential difference of about 1 kV between the counter electrode 18 and the apertured electrode (first aperture) 19. It moves to the apertured electrode (first aperture) 19 side to enter a differential pumping region 21 through a first aperture 20. Adiabatic expansion occurs in the differential pumping region 21. Clustering occurs in which a solvent molecule adheres to the ion. To reduce the clustering, the apertured electrode (first aperture) 19 is preferably heated by a heater.

When using the ion source having the construction of FIG. 2, the primary ion generated by corona discharge moves from the counter electrode 18 to the apertured electrode (first aperture) 19. The gas of the vapor or fine particles including the sample molecule is supplied between the counter electrode 18 and the apertured electrode (first aperture) 19 to bring about an ionization reaction with the primary ion. At this time, a neutral molecule inhibiting the ionization reaction of a neutral nitrogen oxide (NO) generated by the corona discharge is removed from the area of ionization reaction of the sample molecule with the primary ion since the gas flows from the counter electrode 18 to the needle electrode 17. The primary ion generation area due to corona discharge is separated from the ionization reaction area of the primary ion and the sample molecule to identify nitrogen oxide (NO) generated by discharge from the nitrogen oxide (NO) originating from the sample.

The generated sample molecular ion is introduced through the first aperture 20 opened to the apertured electrode (first aperture) 19, the differential pumping region 21 exhausted by a first vacuum pump 24, and a second aperture 23 opened to an apertured electrode (second aperture) 22 into a vacuum region 26 exhausted by a second vacuum pump 25.

A voltage called a drift voltage is applied between the apertured electrode (first aperture) 19 and the apertured electrode (second aperture) 22. The drift voltage causes the ion trapped into the differential pumping region 21 to drift toward the second aperture 23 and has the effect of increasing the ion transmission of the second aperture 23 and the effect of desorbing solvent molecules such as water adhering to the ions due to collision with the gas molecules remaining in the differential pumping region 21.

An acceleration voltage is applied to the apertured electrode (second aperture) 22 to introduce the sample molecule ion into an ion trap region having endcap electrodes 27 and 28 and a ring electrode 29. The initial energy imparted to the ion trap is changed by the acceleration voltage. The trapping efficiency of the ion into the ion trap is changed. The acceleration voltage is set to increase the trapping efficiency.

The ion introduced into the vacuum region 26 is focused by an ion focusing lens 30 to be introduced into the ion trap region. The ion trap region comprises the endcap electrodes 27 and 28, the ring electrode 29 and a quartz ring 31, and a collision gas such as helium is introduced from a gas supply unit 32 through a gas introduction pipe 33. The quartz ring 31 maintains electrical insulation between the endcap electrodes 27 and 28 and the ring electrode 29. A gate electrode 34 performs control to prevent any new ion from being introduced into the ion trap from outside at a timing for analyzing the ion trapped in the ion trap region.

After the trajectory of the ion introduced into the ion trap becomes small due to collision with the collision gas such as helium, a high frequency voltage applied between the endcap electrodes 27 and 28 and the ring electrode 29 is scanned. The ion is discharged outside the ion trap based on its mass number. The discharged ion is detected by a detection region comprising a conversion electrode 34, a scintillator 35 and a photomultiplier 36. The ion collides with the conversion electrode 34 to which an acceleration voltage is applied, thereby discharging a charged particle from the surface. The charged particle is detected by the scintillator 35 to be amplified by the photomultiplier 36. The detected signal is sent to a data processor 37. The mass spectrum obtained by the data processor 37 will be described below in detail.

Figure 5:
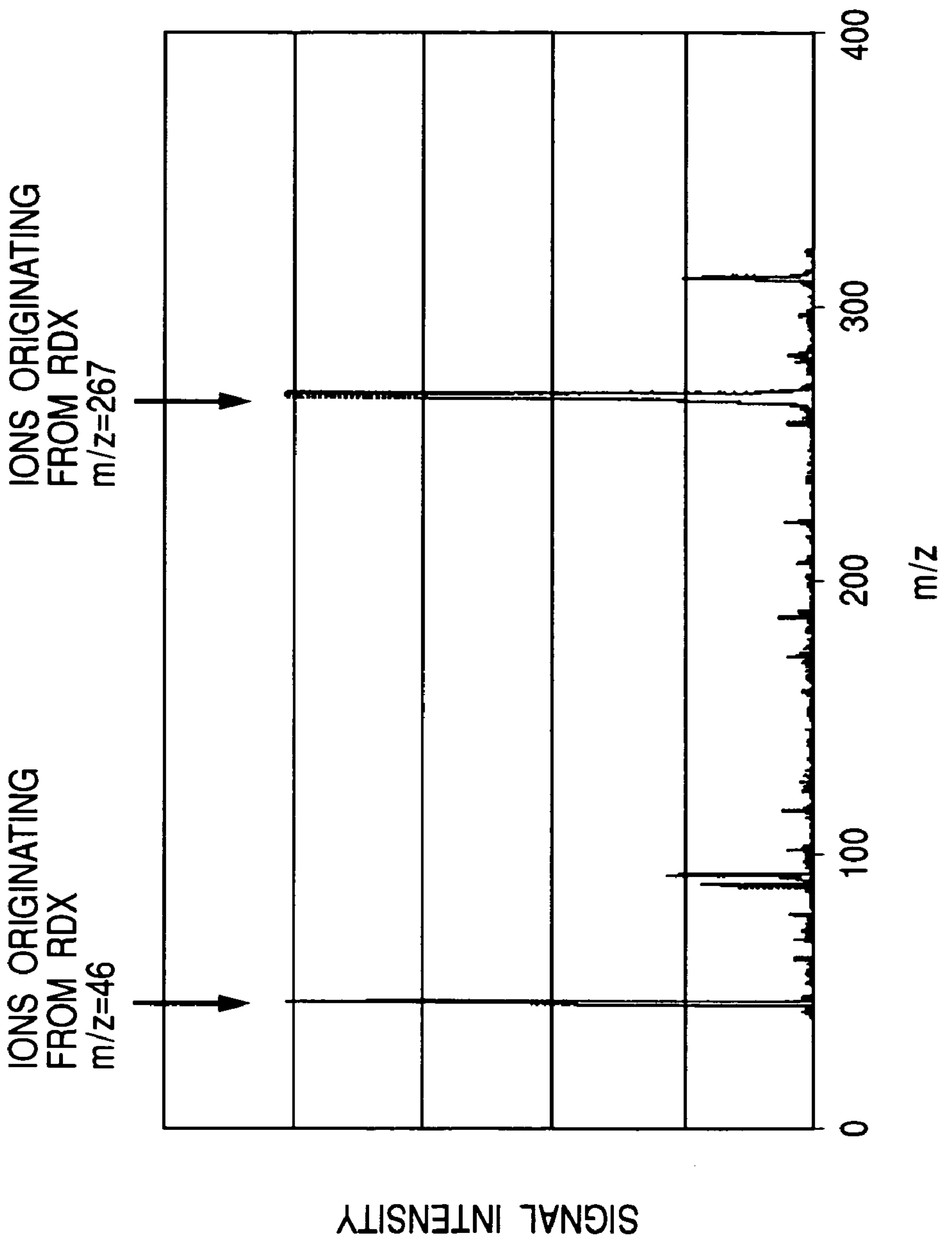
FIG. 5 is a diagram showing a mass spectrum of explosive RDX only obtained by the prior art explosive detection system using a mass spectrometer.

FIG. 5 is a diagram showing mass spectra of explosive RDX obtained using the prior art explosive detection system by a mass spectrometer. RDX is an explosive often used as a main constituent of a plastic explosive.

As shown in FIG. 5, molecular ions (ions originating from RDX) with specific m/z generated from the explosive RDX are detected as ion peaks at m/z=46 and 267. The m/z=267 is assumed to be for $(M+NO_2)^-$, and the m/z=46 is assumed to be for $(NO_2)^-$. In the prior art explosive detection system, the ion peaks of molecular ions with specific m/z generated from the explosive are to be detected.

Figure 6:
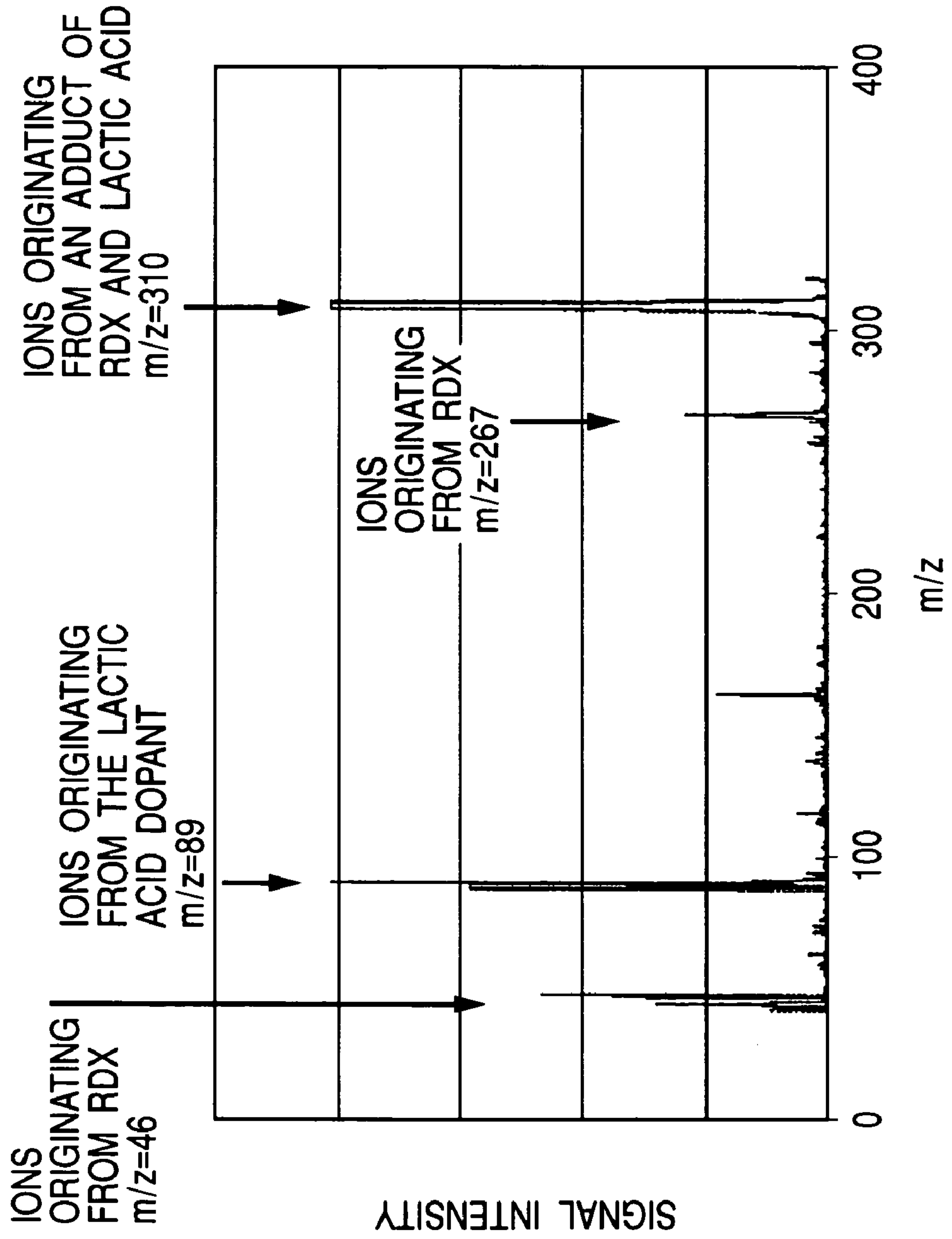
FIG. 6 is a diagram showing a mass spectrum of explosive RDX obtained when using lactic acid as an organic acid dopant according to of the present invention.

FIG. 6 is a diagram showing a mass spectrum of explosive RDX obtained when using lactic acid as an organic acid dopant according to Embodiment 1 of the present invention.

As shown in FIG. 6, molecular ions (ions originating from the lactic acid dopant) generated from lactic acid as a dopant are detected as an ion peak at m/z=89. The m/z=89 is assumed to be an ion peak of ions obtained by desorbing hydrogen from lactic acid. As shown in FIG. 5, molecular ions (ions originating from RDX) with specific m/z generated from the explosive RDX are detected as ion peaks at m/z=46 and 267.

In addition to the ion peaks with specific m/z generated from the explosive RDX, an ion peak of molecular ions obtained by adding a molecule generated from lactic acid to the explosive RDX (ions originating from an adduct of RDX and lactic acid) is detected at m/z=310. This is obtained by adding a lactic acid molecule (a mass number of 89) to the explosive RDX (a mass number of 222) to desorbe hydrogen (a mass number of 1). An ion peak with specific m/z (in the case of RDX, 310) obtained by adding a molecule generated from lactic acid to the explosive molecule is detected to detect RDX.

Figure 7:
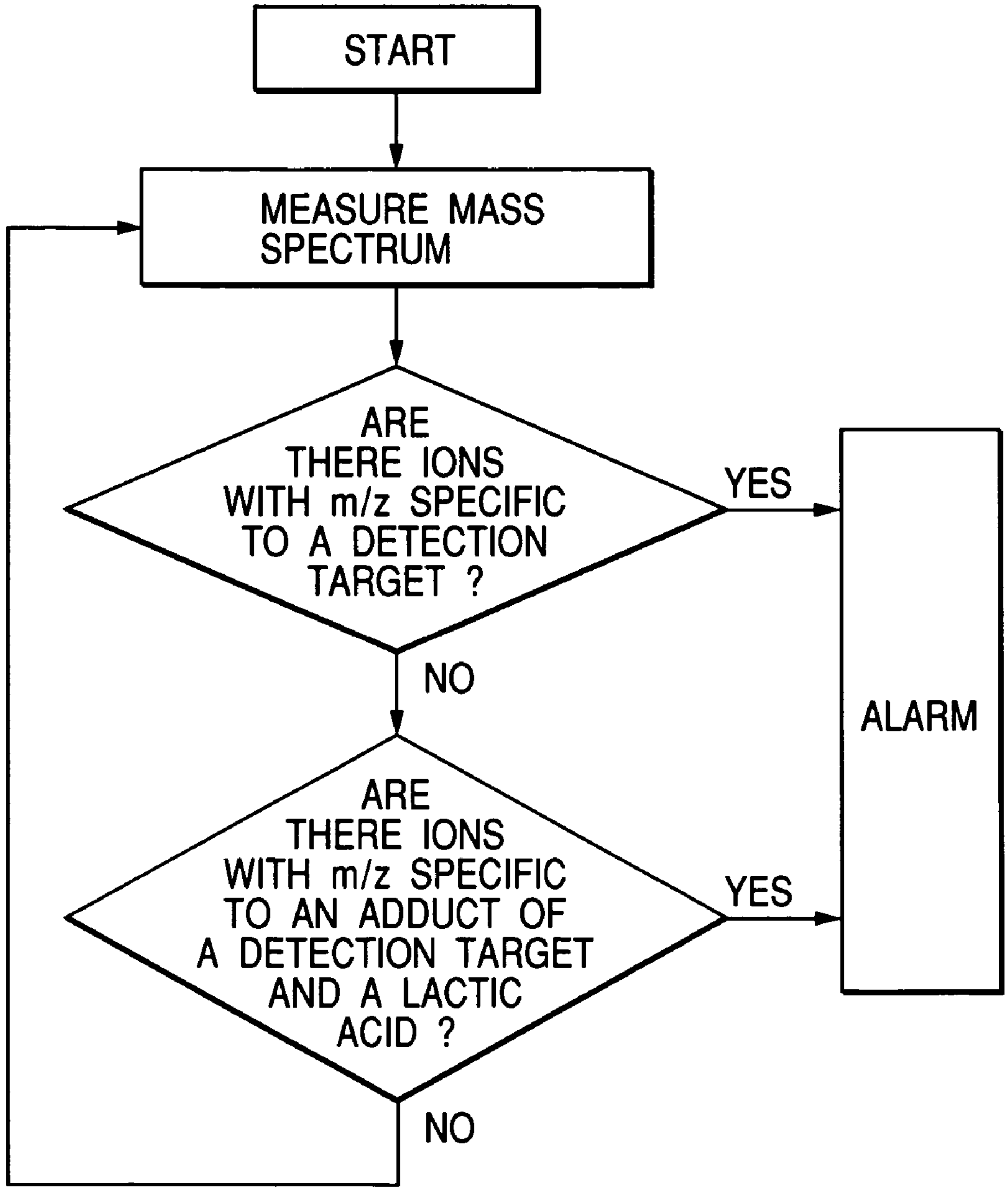
FIG. 7 is a diagram showing an example of an explosive detection flowchart in the explosive detection system according to the first embodiment of the present invention.

FIG. 7 is a diagram showing an example of an explosive detection flowchart in the explosive detection system according to Embodiment 1 of the present invention.

As shown in FIG. 7, an examination is started to measure a mass spectrum and it is sent to the data processor of FIG. 1. From the mass spectrum sent to the data processor of FIG. 1, the presence or absence of ion peaks with specific m/z generated from a detection target is determined. When it is detected, an alarm is sounded. When no ion peaks with specific m/z generated from a detection target are detected, the presence or absence of ion peaks with specific m/z obtained by adding a molecule generated from lactic acid is determined. When it is detected, an alarm is sounded.

When either one of the ion peak with m/z of a molecule generated from a detection target and the ion peak with specific m/z obtained by adding a molecule generated from lactic acid to the detection target is detected, an alarm-may be sounded. These operations are repeated to allow the explosive detection system to function.

In the case that both an ion peak with specific m/z generated from the detection target and an ion peak with specific m/z obtained by adding a molecule generated from lactic acid to the detection target are detected, the determination of the presence or absence of a plurality of ion peaks has a higher reliability than that of determination of a single ion peak for reducing false information. With an organic acid dopant, the original signal originating from the explosive and two or more kinds of adduct ion obtained by adding an ion generated from an organic acid to an explosive molecule, are detected to improve the detection selectivity.

The information on the ion peak with specific m/z generated from the detection target or the ion peak with specific m/z obtained by adding a molecule generated from lactic acid to the detection target used for detection is registered into the data processor or an external database. For explosives other than RDX, the information on the ion peak with specific m/z generated from the detection target or the ion peak with specific m/z obtained by adding a molecule generated from lactic acid to the detection target is registered into the database to increase the number of detection targets.

Figure 8:
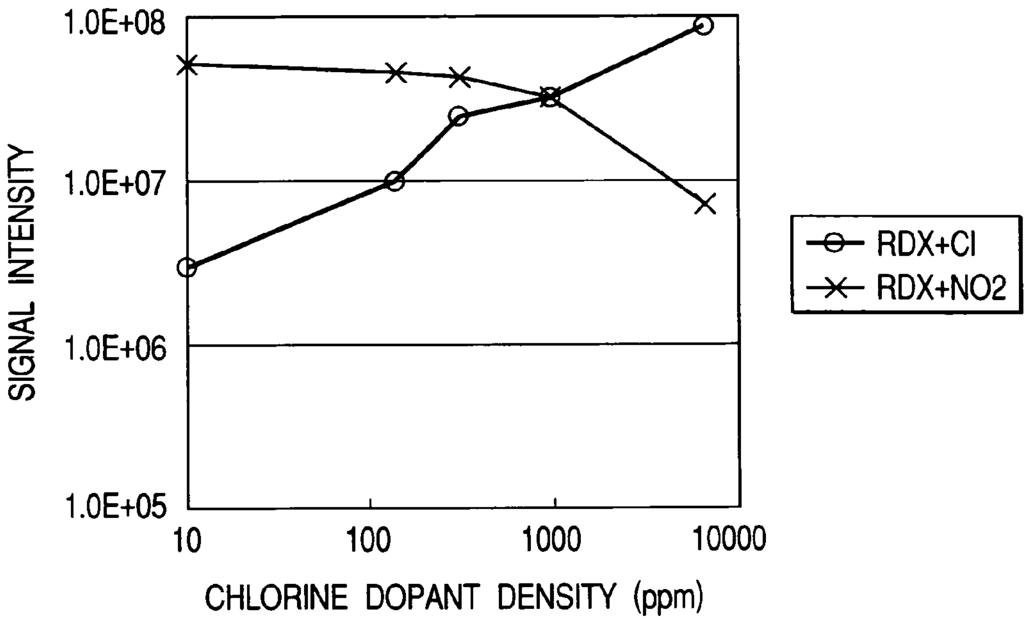
FIG. 8 is a diagram showing a change in signal intensity of a chlorine adduct ion relative to chlorine dopant density when using a chlorine dopant in the explosive detection system according to the first embodiment of the present invention.

FIG. 8 is a diagram showing change in signal intensity (vertical axis) of a chlorine adduct ion relative to chlorine dopant density (horizontal axis) when using a chlorine dopant in the explosive detection system according to Embodiment 1 of the present invention.

Figure 9:
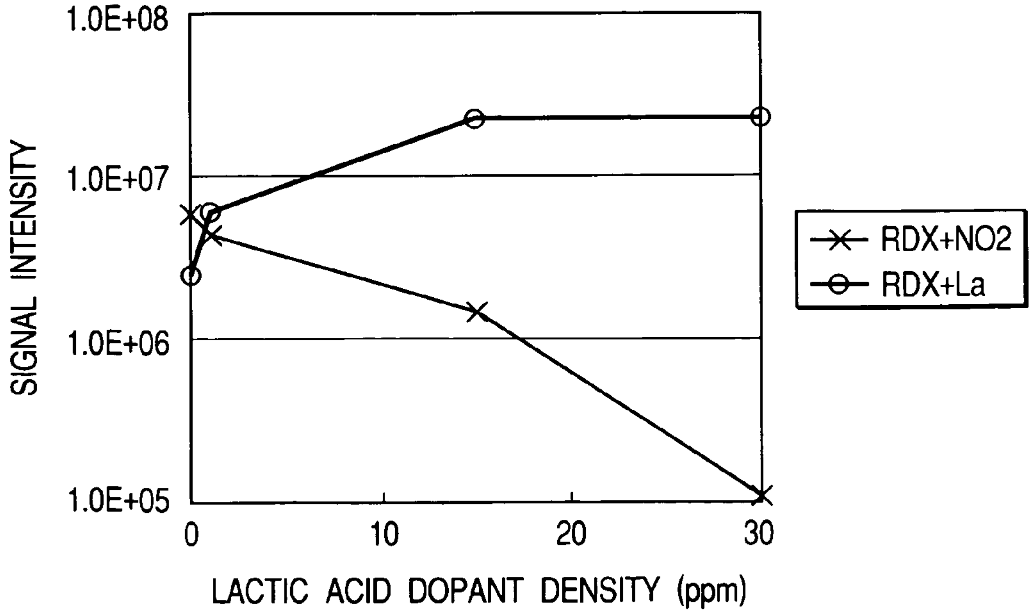
FIG. 9 is a diagram showing a change in signal intensity of a lactic acid adduct ion relative to lactic acid dopant density when using a lactic acid dopant in the explosive detection system according to the first embodiment of the present invention.

FIG. 9 is a diagram showing a change in signal intensity (vertical axis) of a lactic acid adduct ion relative to lactic acid dopant density (horizontal axis) when using a lactic acid dopant in the explosive detection system according to Embodiment 1 of the present invention. The lactic acid dopant means lactic acid introduced into the system.

As shown in FIG. 8, when introducing a chlorine dopant into the system, in order that the signal of the chlorine adduct ion (RDX+Cl) can produce a signal intensity of 1.0E+7 Counts or more, a chlorine dopant density of 100 ppm is necessary.

As shown in FIG. 9, in the case of a lactic acid dopant, the signal of the lactic acid adduct ion (RDX+La) can produce a signal intensity of 1.0E+7 Counts or more at a lactic acid dopant density of 10 ppm. The lactic acid dopant is more effective in a small amount than the chlorine dopant. The consumption of the lactic acid dopant is low and the dopant supply operation is less. The influence of the lactic acid dopant on the environment and the human body is less than that of the chlorine dopant.

The mass number of a molecular ion (mass number of 89) generated from lactic acid is higher than that of chlorine ions (mass numbers of 35 and 37) and is higher than that of $(NO_2)^-$ (mass number of 46) or $(NO_3)^-$ (mass number of 62) as a specific molecule tending to be added to an explosive. When added to an explosive, an adduct ion peak is detected to be at a position of a mass number higher than that of other specific molecules tending to be added to an explosive. The separation of the ion peak obtained by adding a specific molecule from the lactic acid adduct ion peak is easier than the chlorine adduct ion peak. When using a detection method having low selectivity such as the ion mobility method, false detection is less.

[Embodiment 2]

In Embodiment 2, an explosive detection system which performs tandem mass analysis on ions originating from an adduct of an explosive and lactic acid to detect specific dissociated fragment ions, will be described.

Tandem mass analysis method is known as a method for enhancing selectivity in a mass spectrometer. As examples of units applying the tandem mass analysis method are a triple quadrupole mass spectrometer and a quadrupole ion trap mass spectrometer. In the tandem analysis method, mass analysis is performed in two stages. As the first stage of mass analysis, the m/z of ions generated by the ion source is measured. An ion with specific m/z is selected from ions with various m/z.

The selected ion (precursor ion) is dissociated by collision with a neutral gas to generate a fragment ion. As the second stage of mass analysis, mass analysis of the fragment ion is performed. When the precursor ion is dissociated, the part of the molecule which is cleaved depends on the strength of the chemical bond in that part. When the fragment ion is analyzed, a mass spectrum including information on the molecular structure of the precursor ion is obtained.

When the ions generated by the ion source coincidently have the same m/z, the mass spectra of the fragment ions are checked to identify whether the detection target is included or not. The tandem mass analysis method using a triple quadrupole mass spectrometer or a quadrupole ion trap mass spectrometer is widely known, and its detailed description is omitted.

The details of tandem mass analysis of RDX as one kind of typical explosive will be described. Ions with m/z=310 originating from an adduct of RDX and lactic acid are selected as a precursor ion to exclude other ions. Energy is given to the precursor ion for dissociation to obtain a mass spectrum of the fragment ion.

Figure 10:
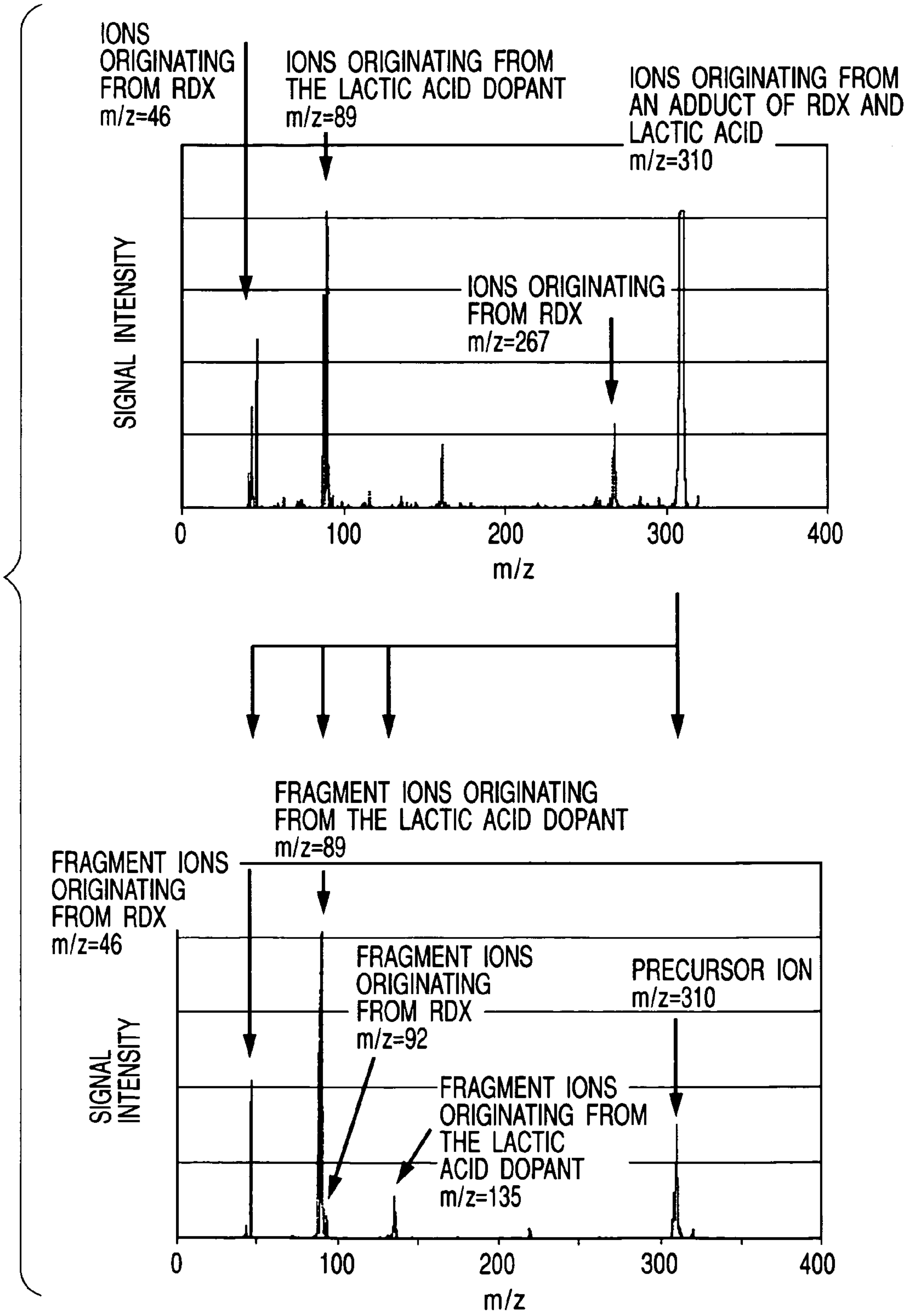
FIG. 10 is a diagram showing a fragment mass-spectrum of a tandem mass analysis of ions originating from an adduct of RDX and lactic acid according to a second embodiment of the present invention.

FIG. 10 is a diagram showing a fragment mass spectrum by the tandem mass analysis of ions originating from an adduct of RDX and lactic acid according to Embodiment 2 of the present invention. FIG. 10 is a diagram showing an example of a fragment mass spectrum obtained by performing tandem mass analysis on a precursor ion of ions originating from an adduct of explosive RDX and lactic acid (m/z=310) when introducing a lactic acid dopant into the system.

Specific fragment ions dissociated and fragmented from the explosive RDX which are generated, are detected as ion peaks at m/z=46 and 92. These fragment ions are generated by decomposition of RDX. (fragment ions originating from RDX)

Ion peaks of the fragment ions are detected at m/z=89 and 135. These are fragment ions generated from lactic acid (fragment ions originating from the lactic acid dopant). The fragment ions shown in FIG. 10 are detected and monitored to allow the explosive detection system to operate.

Tandem mass analysis is performed on the ion with m/z=267 generated only from explosive. The result may be combined with the result of the tandem mass analysis of the lactic acid adduct ion to enhance the detection accuracy of the determination.

For some explosives, when tandem mass analysis is performed on the lactic acid adduct ion, the signals of a specific fragment ion generated from lactic acid and a fragment ion generated from the explosive may be both intensely obtained. In this case, the fragment ion generated from the explosive is to be detected, which is appropriate since the characteristics of the molecular structure of the explosive are expressed well. Alternatively, both the fragment ion of the molecule generated from a lactic acid and the fragment ion of the molecule generated from the explosive may be detected.

[Embodiment 3]

In Embodiment 3, an explosive detection system will be described in which an ion generated from an explosive and an ion obtained by adding a molecule generated from lactic acid to an explosive are subjected to tandem mass analysis simultaneously for dissociation and fragmentation, and a fragment ion of the explosive or a fragment ion of the molecule generated from lactic acid is detected.

In typical tandem mass analysis, one precursor ion is analyzed. In Embodiment 3, tandem mass analysis is performed on two or more precursor ions simultaneously. Ions generated from the explosive are detected as a plurality of ion peaks. Similarly, a plurality of ion peaks obtained by adding a molecule generated from lactic acid to the explosive may be detected. Some of these numerous ion peaks are selected as precursor ions for dissociation. In this method, the ion generated from the explosive and the lactic acid adduct ion may generate the same fragment ions. In such a case, it is particularly effective. When the fragment ions dissociated from a plurality of ion peaks have the same m/z and tandem mass analysis is performed on all of a plurality of ion peaks simultaneously, the fragment ions detected have the same m/z which is detected as a total ion peak. This method has a signal intensity higher than that of the case of performing tandem mass analysis of a single ion peak to increase the detection sensitivity.

The case of RDX will be described. In the case of RDX, there is an ion with m/z=267 generated from the explosive. When tandem mass analysis is performed on this, fragment ions are detected at m/z=46 and 92. When tandem mass analysis is performed on a lactic acid adduct ion with m/z=310, fragment ions generated from the explosive are detected at m/z=46 and 92 and fragment ions generated from lactic acid are detected at m/z=89 and 135. When tandem mass analysis is performed on m/z=267 and the m/z=310 simultaneously, the fragment ions with m/z=46 and 92 generated from the explosive are detected as ion peak signals obtained by totalizing the ion peaks singly subject to tandem mass analysis. The signal intensity is higher than that of the case of performing tandem mass analysis on a single ion peak to improve the detection sensitivity.

The fragment mass spectrum, not shown, obtained in Embodiment 3 has the same pattern as the fragment mass spectrum shown in FIG. 10. The signal intensity at m/z=46 and 92 is increased.

[Embodiment 4]

In Embodiment 4, an explosive detection system using wipe materials dipped in lactic acid will be described.

Figure 11:
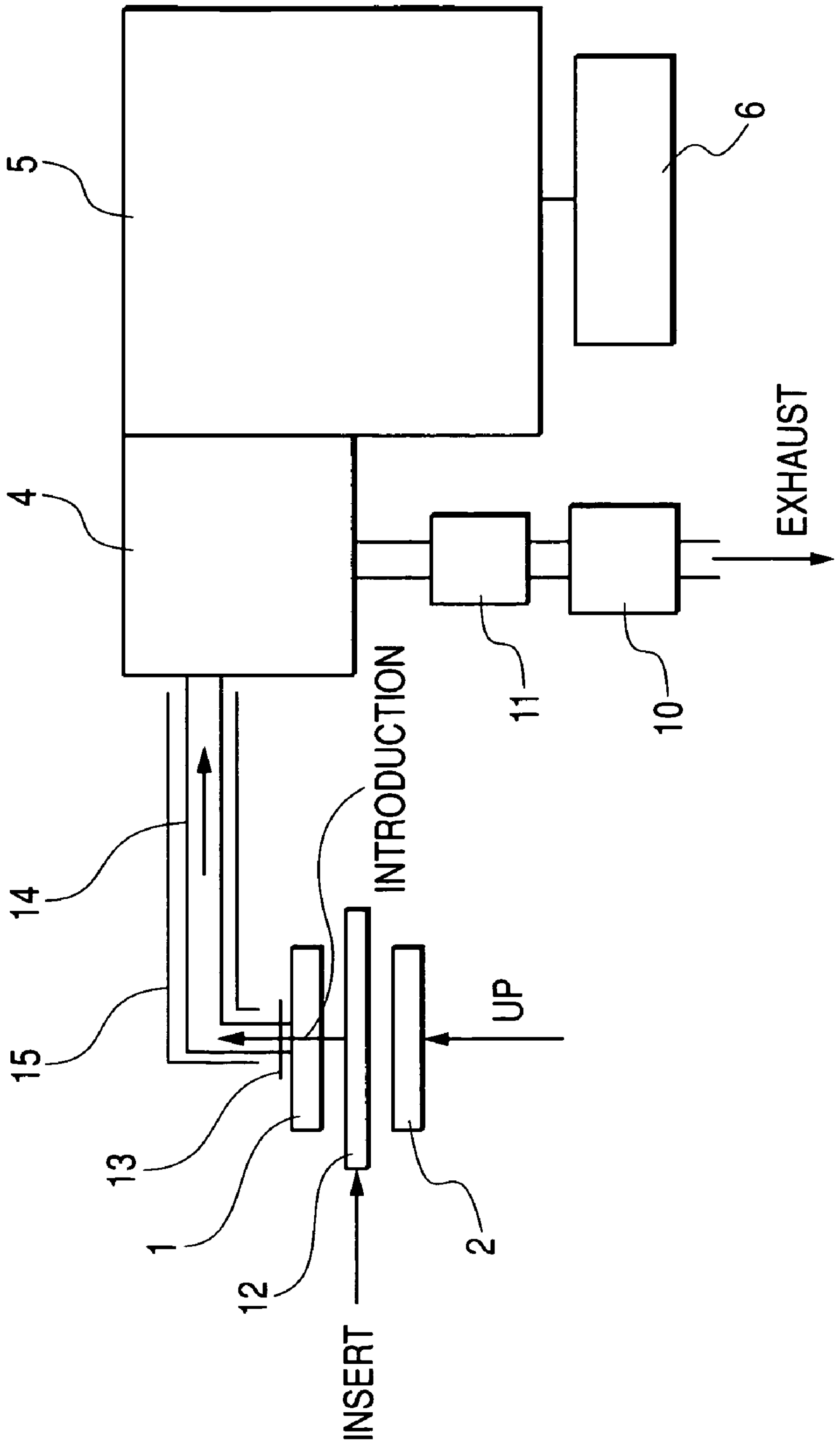
FIG. 11 is a diagram showing an example of an explosive detection system according to a fourth embodiment of the present invention.

FIG. 11 is a diagram showing an example of an explosive detection system according to Embodiment 4 of the present invention. In the system shown in FIG. 11, dipped wipe materials are used.

As shown in FIG. 11, the system comprises a heating unit 2 having an introduction region 1 (upper heater) and a lower heater, an ion source 4, a mass analysis region 5 and a data processor 6. To introduce vapor or fine particles of a sample introduced from the introduction region 1, the ion source 4 introduces the gas at about 0.5 L/min by an intake pump 10 and an intake flow controller 11.

Dipped wipe materials 38 contain lactic acid of 0.1 μg. The amount of lactic acid may be an amount generating sufficient lactic acid gas for detecting a lactic acid adduct ion. Wipe materials containing lactic acid may be used without being dipped in lactic acid. Natural cellulose is used for cotton, which contains lactic acid in a small amount. The lactic acid contained in these wipe materials may be used.

When using wipe materials containing no lactic acid at all and baggage is wiped, lactic acid in small amount adhering to the baggage may be wiped. Lactic acid is used in many cosmetics, and the constituent of the cosmetics and the lactic acid constituent from the human body adhere to the baggage. They are wiped by the wipe materials to be transferred, and are then brought into the same state of being dipped with lactic acid.

In an examination, baggage is wiped by the dipped wipe materials 38 to extract an explosive constituent in a small amount. The dipped wipe materials 38 are inserted into the heating unit 2 having the introduction region 1 (upper heater) and the lower heater. The upper heater and the lower heater may be maintained at a temperature at which the extracted sample is vaporized. For example, both the upper and lower heaters are heated to 210° C. The wipe materials 12 are inserted to raise the lower heater for heating the wipe materials 12, thereby vaporizing the explosive sample. In this case, the lactic acid contained in the dipped wipe materials is gaseous to be mixed with the sample gas, resulting in a mixed gas. The mixed gas passes through a heated filter 13 (for example, heated at 210° C.) and a pipe 14 heated by a pipe heater 15 (for example, heated at 180° C.) to be introduced into the ion source 4. The ion source 4 ionizes the mixed gas and the mass analysis region 5 performs mass analysis thereof.

The obtained mass spectrum is sent to the data processor 6 to determine the presence or absence of an ion peak with specific m/z generated from a detection target. When it is detected, an alarm is sounded. When no ion peak with specific m/z generated from the detection target is detected, the presence or absence of an ion peak with specific m/z corresponding to a molecule generated from lactic acid added to the detection target, is determined. When it is detected, an alarm is sounded.

When one of the ion peak with m/z of a molecule generated from the detection target and the ion peak with specific m/z in which a molecule generated from lactic acid is added to the detection target is detected, an alarm may be sounded. The operations are repeated to allow the explosive detection system to function.

[Embodiment 5]

In Embodiment 5, an explosive detection system based on an introduction method using an organic acid gas generator will be described.

Figure 12:
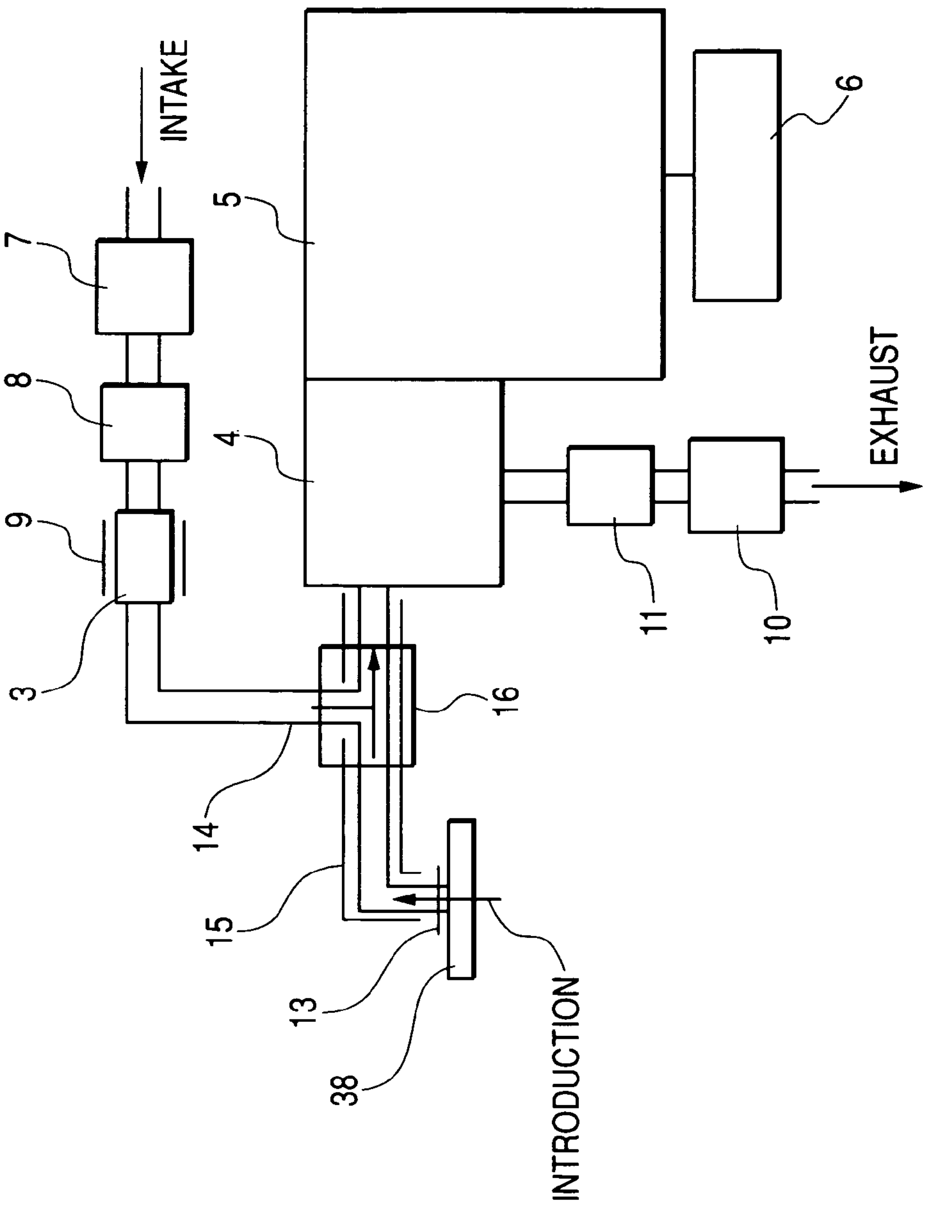
FIG. 12 is a diagram showing an example of an explosive detection system according to a fifth embodiment of the present invention.

FIG. 12 is a diagram showing an example of an explosive detection system according to Embodiment 5 of the present invention. In the system shown in FIG. 12, a sample is introduced by an introduction method using an organic acid gas generator.

As shown in FIG. 12, the system comprises a gas inlet 39, an organic acid gas generator 3, an ion source 4, a mass analysis region 5 and a data processor 6. About 400 μL of lactic acid as an example of an organic acid is put into the organic acid gas generator 3 and is heated to about 40° C. by a generator heater 9 to generate lactic acid vapor. A pushing pump 7 and a pushing flow controller 8 introduce it into the ion source 4 at a flow rate of about 0.1 L/min. In this case, the pushing flow rate may be a flow rate not reversely flowing to the introduction region side. To introduce vapor or fine particles of the sample inserted from the gas inlet 39, the ion source 4 performs exhaustion at about 0.5 L/min by an intake pump 10 and an intake flow controller 11. There is an aperture through which an ion passes between the ion source 4 and the mass analysis region 5. Exhaustion is performed at about 0.5 L/min by the vacuum pump of the mass analysis region 5. The sample gas absorbed into the absorption region 1 is absorbed at about 0.9 L/min.

In an examination, the fine particles or vapor of explosive adhering to human body or baggage is introduced from the gas intake 39. In this case, the fine particles or vapor of the explosive may be introduced by a spray gas such as air. The gas inlet may be provided with a concentrator such as a filter to trap the fine particles or vapor of the explosive to heat it for vaporization. The concentrator of the gas inlet may be provided with a large capacity pump in addition to the intake pump 10 to trap the fine particles or vapor of the explosive at once.

The gas intake 39 may be maintained at a temperature at which the extracted sample is vaporized and is heated to 210° C. It is provided with a mechanism maintaining a distance between the heating unit and the human body or baggage so as to prevent them from being in direct contact with each other. The introduced sample passes through a heated filter 13 (for example, heated to 210° C.) and a pipe 14 heated by a pipe heater 15 (for example, heated to 180° C.) to be mixed with lactic acid vapor generated by the organic acid gas generator 3 by the mixer 16, resulting in a mixed gas so that it is introduced into the ion source 4. The ion source 4 ionizes the mixed gas and the mass analysis region 5 performs mass analysis thereof.

The obtained mass spectrum is sent to the data processor 6 to determine the presence or absence of an ion peak with specific m/z generated from the detection target. When it is detected, an alarm is sounded. When no ion peak with specific m/z generated from the detection target is detected, the presence or absence of the ion peak with specific m/z corresponding to a molecule generated from lactic acid which is added to the detection target, is determined. When it is detected, an alarm is sounded.

When one of the ion peak with m/z of a molecule generated from the detection target and the ion peak with specific m/z in which a molecule generated from lactic acid is added to the detection target is detected, an alarm may be sounded. These operations are repeated to allow the explosive detection system to function.

[Embodiment 6]

In the above embodiments, lactic acid is used as an organic acid dopant. In Embodiment 6, the result in which another organic acid or organic acid salt is used as a dopant will be described.

An embodiment using succinic acid as an organic acid dopant will be described.

Figure 13:
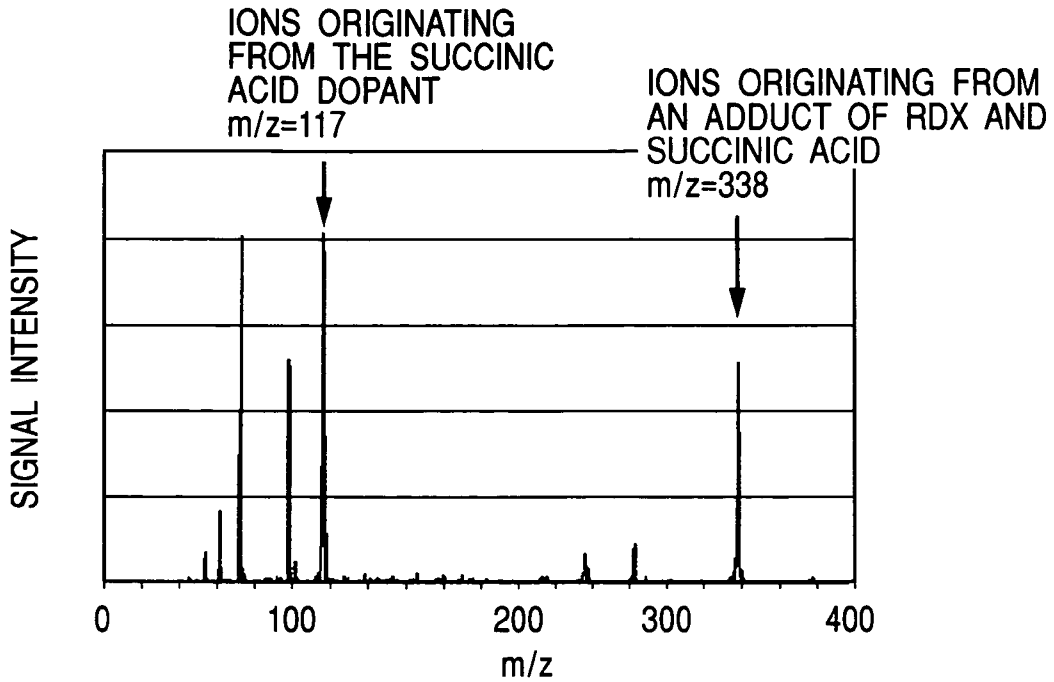
FIG. 13 is a diagram showing a mass spectrum of explosive RDX obtained when using succinic acid as a dopant according to a sixth embodiment of the present invention.

FIG. 13 is a diagram showing a mass spectrum of explosive RDX obtained when succinic acid is introduced as a dopant into the system according to Embodiment 6 of the present invention.

Succinic acid is an organic acid containing a hydroxyl group or a carboxyl group as in lactic acid. The mass number of succinic acid (mass number of 118) is larger than that of lactic acid (mass number of 90). About 400 μL of succinic acid is introduced into the organic acid gas generator 3 to generate succinic acid gas. Explosive RDX of 50 ng is dropped onto wipe materials to be inserted into the heating unit 2. Specific molecular ions generated from succinic acid (ions originating from the succinic acid dopant) are detected at m/z=117. This is assumed to be a hydroxyl desorbed ion of succinic acid.

A succinic acid adduct ion (ions originating from an adduct of RDX and succinic acid) obtained by adding a molecule generated from succinic acid to RDX is detected at m/z=338. Here, the aim is to detect m/z=338. An organic acid adduct ion is generated in an organic acid having a mass number larger than that of lactic acid. The mass number of the main explosive is about 400 or below. A mass number of about 40 to 400 of an organic acid may be used. When the molecular weight of the organic acid is too large, the vapor pressure is lowered as it is hard to generate gas. A molecular ion which is too large does not easily generate an adduct ion with the explosive.

An embodiment using butyric acid as an organic acid dopant will be described.

Figure 14:
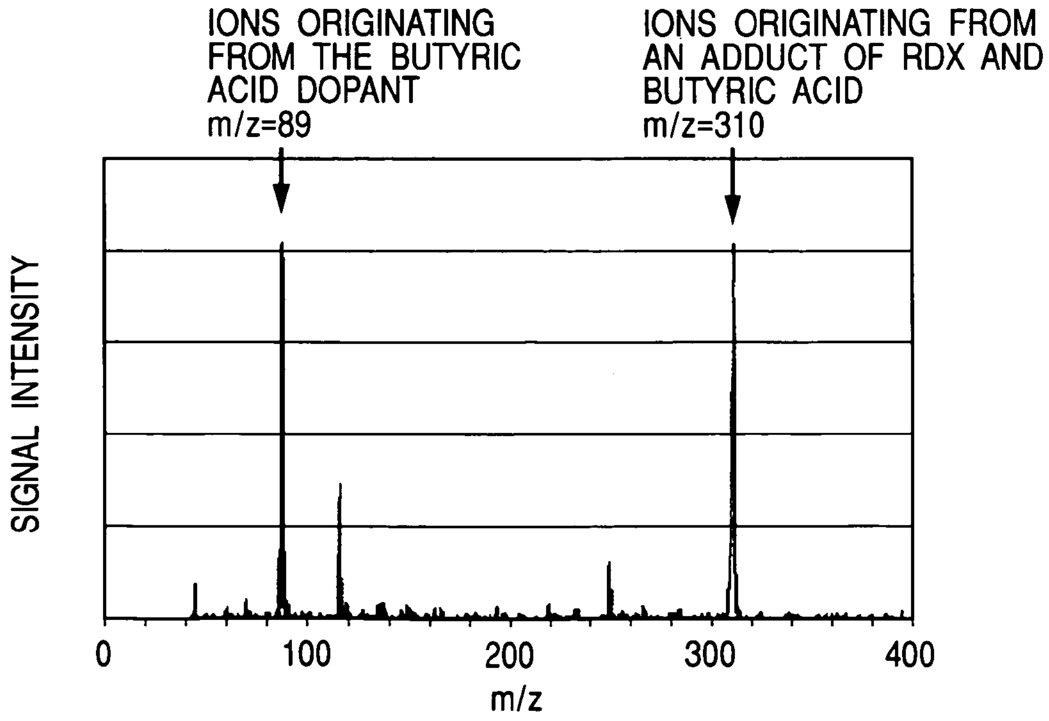
FIG. 14 is a diagram showing a mass spectrum of explosive RDX obtained when using butyric acid as a dopant according to the sixth embodiment of the present invention.

FIG. 14 is a diagram showing a mass spectrum of explosive RDX obtained when butyric acid is introduced as a dopant into the system according to Embodiment 6 of the present invention.

Butyric acid is an organic acid containing a hydroxyl group or a carboxyl group as in lactic acid. The mass numbers of lactic acid (mass number of 90) and butyric acid (mass number of 89) are almost the same. About 400 μL of butyric acid is introduced into the organic acid gas generator 3 to generate butyric acid gas. Explosive RDX of 50 ng is dropped onto wipe materials to be inserted into the heating unit 2. Specific molecular ions generated from butyric acid (ions originating from the butyric acid dopant) are detected at m/z=89. A butyric acid adduct ion obtained by adding a molecule generated from butyric acid to RDX (ions originating from an adduct of RDX and butyric acid) is detected at m/z=310. Here, the aim is detect m/z=310.

An embodiment wherein sodium lactate which is a salt of lactic acid, is used as an organic acid dopant, will be described as an example of an organic acid salt.

Figure 15:
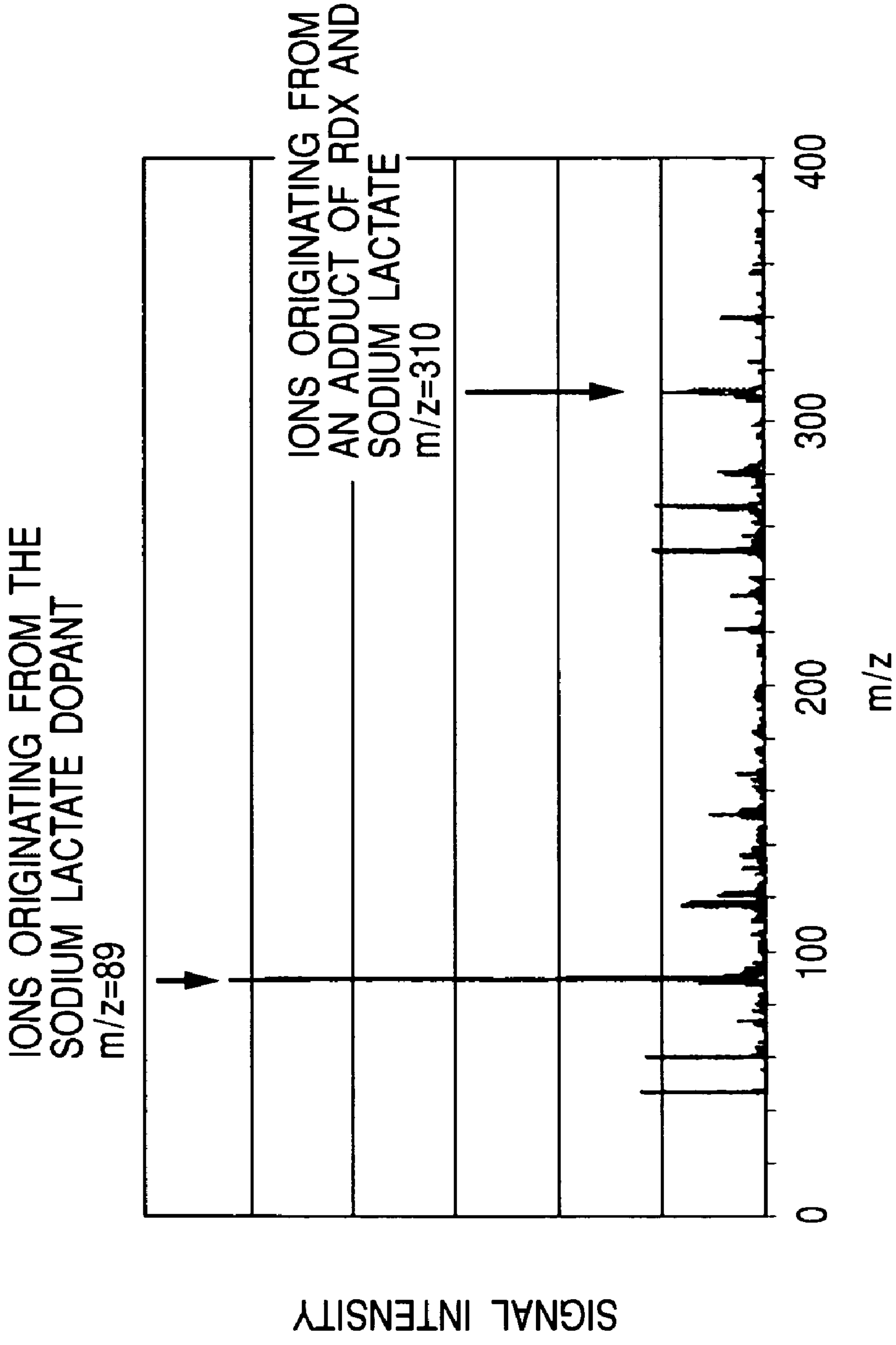
FIG. 15 is a diagram showing a mass spectrum of explosive RDX obtained when using sodium lactate as a dopant according to the sixth embodiment of the present invention.

FIG. 15 is a diagram showing a mass spectrum of explosive RDX obtained when sodium lactate is introduced as a dopant into the system according to Embodiment 6 of the present invention.

The mass number of sodium lactate is 112 and is larger than that of lactic acid (mass number of 90). About 400 μL of sodium lactate is introduced into the organic acid gas generator 3 to generate sodium lactate gas. Explosive RDX of 50 ng is dropped onto wipe materials to be inserted into the heating unit 2. Specific molecular ions generated from sodium lactate (ions originating from the sodium lactate dopant) are detected at m/z=89.

A sodium lactate adduct ion obtained by adding a molecule generated from sodium lactate to RDX (ions originating from an adduct of RDX and sodium lactate) is detected at m/z=310. Here, the aim is to detect m/z=310. The sodium lactate may be heated to thermally decompose to lactic acid gas. When an organic acid or an organic acid salt having a molecular weight of 40 to 400 is used, the organic acid or the organic acid salt causes thermal decomposition so that the organic acid molecule generates an adduct ion of a detection target.

The apparatus for detecting chemical substances according to the present invention detects an ion generated by reaction with a molecule generated from an organic acid or an organic acid salt to detect environmental chemical substances, harmful chemical substances, narcotics and explosives.

What is claimed is:

1. An apparatus for detecting chemical substances, comprising: an ion source ionizing a sample, an analysis region measuring an ion species of said sample, and a data processor determining the presence or absence of a target chemical substance to be detected in said sample based on the analysis result of said ion species, wherein said data processor determines the detection or non-detection of an adduct ion of a molecule of said target chemical substance with a molecule of an organic acid or an organic acid salt having a mass number of 40 to 400.

2. The apparatus for detecting chemical substances according to claim 1, wherein said organic acid or said organic acid salt is an organic acid or an organic acid salt having a hydroxyl group or a carboxyl group.

3. The apparatus for detecting chemical substances according to claim 1, wherein said data processor determines the detection or non-detection of said generated ion, or the detection or non-detection of an adduct ion of a molecule generated from said organic acid or said organic acid salt with a molecule of said target chemical substance to determine the presence or absence of said target chemical substance.

4. The apparatus for detecting chemical substances according to claim 1, wherein said data processor determines one or more of the detection or non-detection of an ion generated from said target chemical substance, the detection or non-detection of said generated ion, and the detection or non-detection of an adduct ion of a molecule generated from said organic acid or said organic acid salt with a molecule of said target chemical substance to determine the presence or absence of said target chemical substance.

5. The apparatus for detecting chemical substances according to claim 1, wherein tandem mass analysis is performed on said generated ion, and said data processor determines the detection or non-detection of a fragment ion of said generated ion to determine the presence or absence of said target chemical substance.

6. The apparatus for detecting chemical substances according to claim 1, wherein tandem mass analysis is performed on an adduct ion of a molecule generated from said organic acid or said organic acid salt with a molecule of said target chemical substance, and said data processor determines the detection or non-detection of a fragment ion of said generated ion to determine the presence or absence of said target chemical substance.

7. The apparatus for detecting chemical substances according to claim 1, wherein tandem mass analysis is performed simultaneously on one or more of an ion generated from said target chemical substance, said generated ion, and an adduct ion of a molecule generated from said organic acid or said organic acid salt with a molecule of said target chemical substance, and said data processor determines the detection or non-detection of a fragment ion of an ion generated from said target chemical substance and the detection or non-detection of a fragment ion of said generated ion to determine the presence or absence of said target chemical substance.

8. An apparatus for detecting chemical substances, comprising: a heating unit for generating a sample gas, a gas generator for generating a gas of an organic acid or an organic acid salt having a mass number of 40 to 400, a gas mixer for mixing the gas of said organic acid or said organic acid salt with said sample gas generated by said heating unit to generate a mixed gas, a mass analysis region for obtaining a mass spectrum of an ion of said mixed gas, and a data processor for determining the presence or absence of a target chemical substance to be detected in said sample based on said mass spectrum, wherein said data processor determines the detection or non-detection of an adduct ion of a molecule of said target chemical substance with a molecule of said organic acid or said organic acid salt to determines the presence or absence of said target chemical substance.

9. An apparatus for detecting chemical substances, comprising: an introduction region for introducing a sample gas, a gas generator for generating a gas of an organic acid or an organic acid salt having a mass number of 40 to 400, a gas mixer for mixing the gas of said organic acid or said organic acid salt with said sample gas introduced by said introduction region to generate a mixed gas, a mass analysis region for obtaining a mass spectrum of an ion of said mixed gas, and a data processor for determining the presence or absence of a target chemical substance to be detected in said sample gas based on said mass spectrum, wherein said data processor determines the detection or non-detection of an adduct ion of a molecule of said target chemical substance with a molecule of said organic acid or said organic acid salt to determine the presence or absence of said target chemical substance.

10. An apparatus for detecting chemical substances, comprising: wipe materials containing an organic acid or an organic acid salt having a mass number of 40 to 400 to extract a sample from a detection target, a heating unit for heating the wipe materials to generate a mixed gas obtained by mixing a gas of said organic acid or said organic acid salt with a gas of said sample, a mass analysis region for obtaining a mass spectrum of an ion of said mixed gas, and a data processor for determining the presence or absence of a target chemical substance to be detected in said sample based on said mass spectrum, wherein said data processor determines the detection or non-detection of an adduct ion of a molecule of said target chemical substance with a molecule of said organic acid or said organic acid salt to determine the presence or absence of said target chemical substance.

11. A method for detecting chemical substances, comprising the steps of: ionizing a sample, analyzing an ion species of said sample, and determining the detection or non-detection of an adduct ion of a molecule of said target chemical substance with a molecule of an organic acid or an organic acid salt having a mass number of 40 to 400 based on the analysis result of said ion species to determine the presence or absence of said target chemical substance.

12. A method for detecting chemical substances, comprising the steps of: generating a sample gas, mixing a gas of an organic acid or an organic acid salt having a mass number of 40 to 400 with said sample gas to generate a mixed gas, ionizing said mixed gas, obtaining a mass spectrum of an ion of said mixed gas, and determining the detection or non-detection of an adduct ion of a molecule of said target chemical substance with a molecule of said organic acid or said organic acid salt to determine the presence or absence of said target chemical substance.

13. The apparatus for detecting chemical substances according to claim 1, wherein said organic acid or said organic acid salt is a lactic acid or a lactate.

14. The apparatus for detecting chemical substances according to claim 10, wherein said organic acid or organic acid salt is at least one of a lactic acid, a lactate, and succinic acid.

15. The apparatus for detecting chemical substances according to claim 10, wherein said data processor determines the detection or non-detection of at least one of an adduct ion of a molecule of said target chemical substance with a molecule of a lactic acid, lactate, or succinic acid, hydrogen desorbed of said adduct ion, hydrogen added of said adduct ion, and fragment ion of said adduct ion.

16. An apparatus for detecting chemical substances, comprising: wipe materials to extract a sample from a detection target, a heating unit for heating the wipe materials, a sample introduction unit for introducing gas from said heated wipe materials by said heating unit, an ion source for ionizing said gas introduced from said sample introduction unit, a mass analysis region for obtaining a mass spectrum of ion ionized by said ion source, a data processor for determining the presence or absence of a target chemical substance to be detected in said sample based on said mass spectrum, wherein said data processor determines the detection or non-detection of an adduct ion of a molecule of said target chemical substance with a organic molecule contained in said gas generated from said heated wipe materials.

17. An apparatus for detecting chemical substances, comprising: an ion source ionizing a sample, an analysis region measuring an ion species of said sample, and a data processor determining the presence or absence of a target chemical substance to be detected in said sample based on the analysis result of said ion species, wherein said data processor determines the detection or non-detection of an adduct ion of a molecule of said target chemical substance with an organic molecule.

18. The apparatus for detecting chemical substances according to claim 17, wherein said organic molecule is at least one of a lactic acid, lactate, and succinic acid.

19. A method for detecting chemical substances, comprising the steps of: ionizing a sample, analyzing an ion species of said sample, and determining the detection or non-detection of an adduct ion of a molecule of said target chemical substance with an organic molecule based on the analysis result of said ion species to determine the presence or absence of said target chemical substance, and alarming based on said detection of said target chemical substance or said adduct ion.

* * * * *